(12) United States Patent
Duong

(10) Patent No.: US 9,399,931 B2
(45) Date of Patent: Jul. 26, 2016

(54) COGENERATION METHOD AND EQUIPMENT

(71) Applicant: SUEZ ENVIRONNEMENT, Paris la Defense (FR)

(72) Inventor: Frederic Duong, Pezilla-la-Riviere (FR)

(73) Assignee: SUEZ ENVIRONMENT (FR)

( * ) Notice: Subject to any disclaimer, the term of this patent is extended or adjusted under 35 U.S.C. 154(b) by 238 days.

(21) Appl. No.: 14/366,587

(22) PCT Filed: Dec. 18, 2012

(86) PCT No.: PCT/IB2012/057419
§ 371 (c)(1),
(2) Date: Jun. 18, 2014

(87) PCT Pub. No.: WO2013/093770
PCT Pub. Date: Jun. 27, 2013

(65) Prior Publication Data
US 2014/0318130 A1    Oct. 30, 2014

(30) Foreign Application Priority Data

Dec. 19, 2011  (FR) ...................................... 11 61897

(51) Int. Cl.
| F01K 17/00 | (2006.01) |
| F01K 7/34 | (2006.01) |
| F01K 17/02 | (2006.01) |
| F01K 7/38 | (2006.01) |
| F01K 9/00 | (2006.01) |

(52) U.S. Cl.
CPC ................. *F01K 17/02* (2013.01); *F01K 7/345* (2013.01); *F01K 7/38* (2013.01); *F01K 9/00* (2013.01); *Y02E 20/14* (2013.01)

(58) Field of Classification Search
CPC ............. F01K 17/02; F01K 7/38; F01K 9/00; F01K 7/345; Y02E 20/14
USPC ..................................................... 60/648, 678
See application file for complete search history.

(56) References Cited

U.S. PATENT DOCUMENTS 3,842,605 A * 10/1974 Tegtmeyer ................ F01K 7/22
                                                60/678
3,972,196 A *  8/1976 Silvestri, Jr. ............ F01K 19/08
                                                60/670

(Continued)

FOREIGN PATENT DOCUMENTS

| DE | 19535318 | 3/1997 |
| DE | 10052766 | 5/2002 |
| JP | 61126309 | 6/1986 |

OTHER PUBLICATIONS

International Search Report in International Application PCT/IB2012/057419 mailed Mar. 25, 2013.

(Continued)

*Primary Examiner* — Hoang Nguyen
(74) *Attorney, Agent, or Firm* — The Belles Group, P.C.

(57) ABSTRACT

Cogeneration method, according to which a hot source (2) produces steam that is released in at least one turbine (3) having a low-pressure steam outlet (5) linked to a condenser; at least a fraction (Q) of the steam leaving the turbine (3) is directed towards a Venturi thermocompressor (14) into which a fluid having higher pressure and temperature than the outgoing steam is injected, resulting in a fluid having higher pressure and temperature than the outgoing steam, and this mixture is directed towards a second condenser (21) where the heat of the mixture is transferred to an auxiliary fluid of a circuit (23) external to the thermodynamic cycle.

12 Claims, 3 Drawing Sheets

(56) References Cited

U.S. PATENT DOCUMENTS 7,040,095 B1\* 5/2006 Lang .......................... F01K 7/42
60/653
8,091,361 B1\* 1/2012 Lang ....................... F01K 3/002
60/653

OTHER PUBLICATIONS

Translation of Written Opinion of the International Searching Authority for PCT/IB2012/057419.

\* cited by examiner

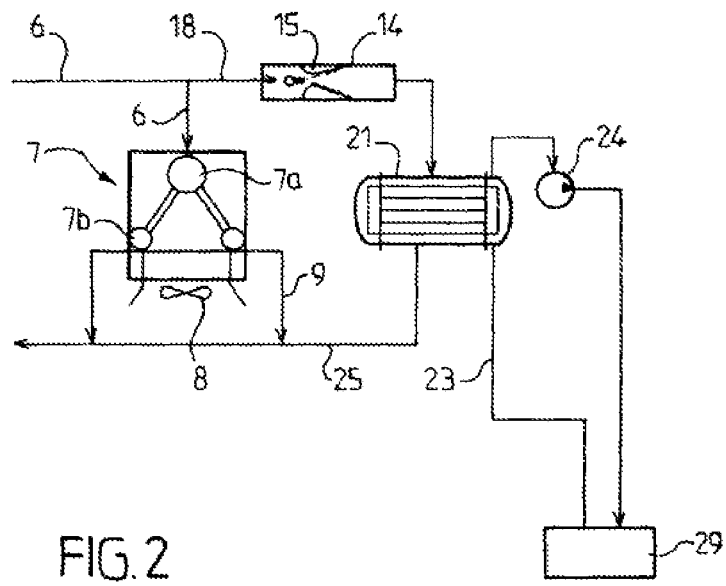
FIG.2
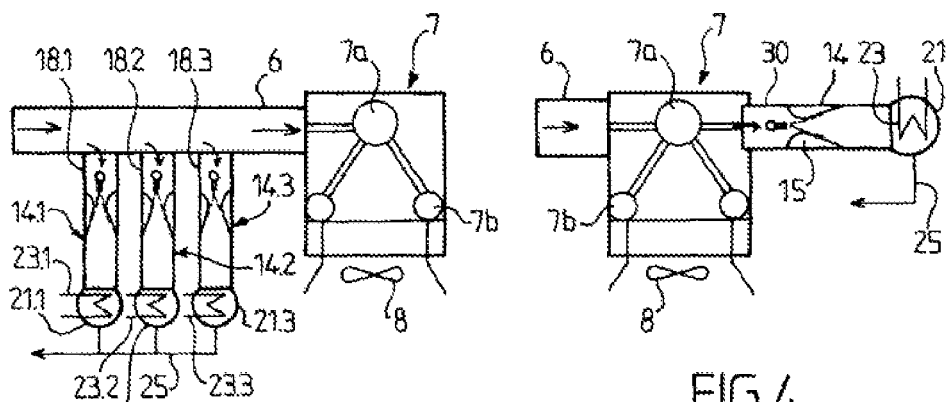
FIG.3
FIG.4
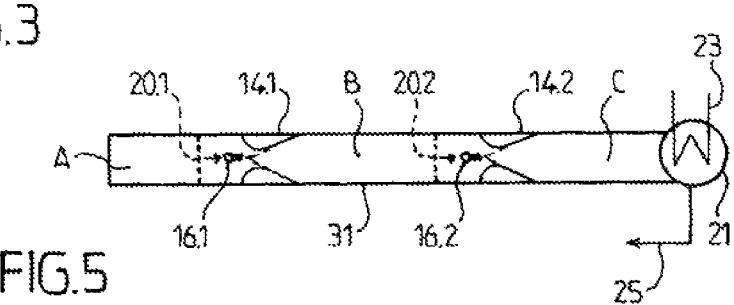
FIG.5

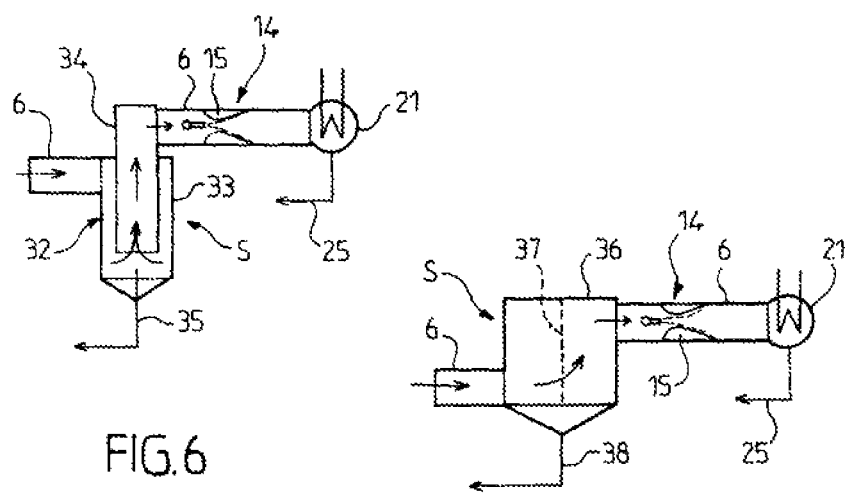
FIG.6
FIG.8
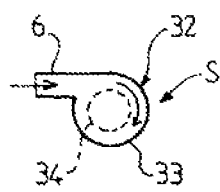
FIG.7
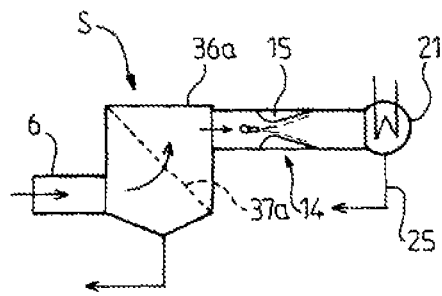
FIG.9

COGENERATION METHOD AND EQUIPMENT

PRIORITY

Priority is claimed as a national stage application, under 35 U.S.C. §371, to international application No. PCT/IB2012/057419, filed Dec. 18, 2012, which claims priority to French application FR1161897, filed Dec. 19, 2011. The disclosures of the aforementioned priority applications are incorporated herein by reference in their entirety The invention relates to a cogeneration method whereby a hot source produces steam which is expanded through at least one condensation turbine the very-low-pressure steam outlet of which is connected to a condenser.

Cogeneration consists in simultaneously producing electricity and heat from a steam turbine, a gas turbine or a combustion engine. The electricity is produced by a generator turned by the turbine.

The low-pressure steam leaving the turbine exhaust still contains latent energy, but at relatively low temperature and pressure levels that do not allow some of this energy to be used efficiently for conventional heating purposes.

The invention more particularly relates to a cogeneration method the hot source of which consists of a boiler fitted with a hearth in which waste or any fuels of biomass or fossil origin (coal, oil, gas) is incinerated, the energy thus produced by burning the waste being denoted by the symbol EfW (which stands for "Energy from Waste").

Document JP 61 126309 relates to an energy production method of the kind whereby a hot source produces steam which is expanded through at least one turbine the low-pressure steam outlet of which is connected to a condenser, at least a fraction of the low-pressure steam leaving the turbine is directed toward a venturi-effect thermocompressor in which the steam, tapped from an intermediate stage of the turbine, at a temperature and pressure that are higher than those of the low-pressure steam, is injected near the throat of the venturi in order to yield a resultant fluid the pressure and temperature of which are higher than those of the low-pressure steam leaving the turbine, this resultant fluid being directed toward a second condenser. This condenser preheats the condensate coming from the first condenser, inside the thermodynamic cycle of the turbine. The amount of heat recuperated is small because the temperature of the recompressed steam that constitutes the hot fluid is close to that of the condensate leaving the first condenser.

The primary objective of the invention is to provide a cogeneration method that allows more efficient use to be made of the energy contained in the low-pressure steam leaving the turbine, without leading to investment and operating expenditure which from an economic standpoint proves prohibitive.

According to the invention, a method as defined hereinabove, for cogeneration, is characterized in that the second condenser has passing through it an auxiliary fluid from a circuit external to the thermodynamic cycle of the turbine and in that all or some of the latent heat of condensation of the steam, on the exhaust side of the turbine, is transferred to the external circuit.

The auxiliary fluid is a fluid external to the thermodynamic cycle and allows an external use of the heat, notably for an urban heating network, to dry sludge or other biomass, or allows an internal use for preheating the combustion air. The amount of heat exported according to the invention may reach 50% of the heat of the fuel of the boiler because, depending on requirements, all of the vacuum steam on the outlet side of the turbine can be recuperated and put to use, whereas the flow rate of steam fed to the first condenser can become near zero.

The invention is completely different from known vacuum ejectors because it combines thermocompression with cogeneration using the latent heat available on the exhaust side of a steam turbine.

The auxiliary fluid may consist of water for heating buildings or market-garden greenhouses.

Advantageously, the steam tapped from the intermediate stage of the turbine and injected into the thermocompressor is at a pressure of around 5 bar. More generally, the medium-pressure steam tapped from the intermediate stage of the turbine is at a pressure suited to the necessary compression ratio.

The steam pressure on the outlet side of the turbine may be comprised between 100 and 240 mbar (temperature between 46° C. and 64° C.) and that on the outlet side of the thermocompressor may be comprised between 200 mbar and 500 mbar (temperature between 60° C. and 81° C.).

The invention also relates to a cogeneration plant for implementing a method as defined hereinabove, comprising a hot source producing steam which is expanded through at least one turbine the outlet of which is connected to a condenser, and comprising at least one venturi-effect thermocompressor, means for directing at least a fraction of the low-pressure steam leaving the turbine toward the thermocompressor, and means for injecting into the thermocompressor steam at a temperature and pressure that are higher than those of the steam leaving so as to yield a resultant fluid the pressure and temperature of which are higher than those of the steam leaving the turbine, and a second condenser toward which this resultant fluid is directed, the plant being characterized in that it comprises an external circuit for an auxiliary fluid, and the second condenser has passing through it the auxiliary fluid so that all or some of the latent heat of condensation of the steam, on the exhaust side of the turbine, is transferred to the external circuit.

The auxiliary fluid external circuit may consist of a medium-temperature hot water network, notably for heating buildings or market-garden greenhouses.

Advantageously, the plant comprises a branch branching off from the turbine outlet pipe, the venturi-effect thermocompressor being installed on this branch-off, upstream of the first condenser.

The plant may comprise several branches in parallel branching off from the turbine outlet pipe, a venturi-effect thermocompressor being installed on each branch-off, upstream of the first condenser.

The plant may comprise several venturi-effect thermocompressors installed in series, one after another.

The plant may comprise a water droplet separator for eliminating water droplets from the steam prior to entry into the thermocompressor.

The outlet pressure of the turbine may be comprised between 100 and 240 mbar (temperature between 46° C. and 64° C.) and that on the outlet side of the thermocompressor may be comprised between 200 mbar and 500 mbar (temperature between 60° C. and 81° C.), the medium-pressure steam of the turbine being around 5 bar, but which could be higher or lower depending on the recompression ratio to be obtained.

The means for injecting into the thermocompressor a fluid at a temperature and a pressure that are higher than those of the outgoing steam may comprise a pipe that taps medium-pressure steam from an intermediate stage of the turbine.

In one alternative form, the venturi-effect thermocompressor is installed in series on the outlet pipe of the turbine, downstream of the first condenser.

Apart from the arrangements set out hereinabove, the invention consists in a certain number of other arrangements that will be discussed more fully below with regard to exemplary embodiments described with reference to the attached nonlimiting drawings. In these drawings:

FIG. 2 is a partial diagram of an alternative form of the embodiment of the plant.

FIG. 3 is a partial diagram of one alternative form with three thermocompressors in parallel.

FIG. 4 is a partial diagram of one alternative form with one thermocompressor.

FIG. 5 is a partial diagram of an alternative form with two thermocompressors mounted in series.

FIG. 6 is a simplified diagram of a device with a cyclone effect for separating the water droplets from the steam.

FIG. 7 is a schematic section through the separator device of FIG. 6.

FIG. 8 is a diagram in vertical section of another device for separating the water droplets and FIG. 9 is a diagram of an alternative form of the device of FIG. 8.

Figure 1:
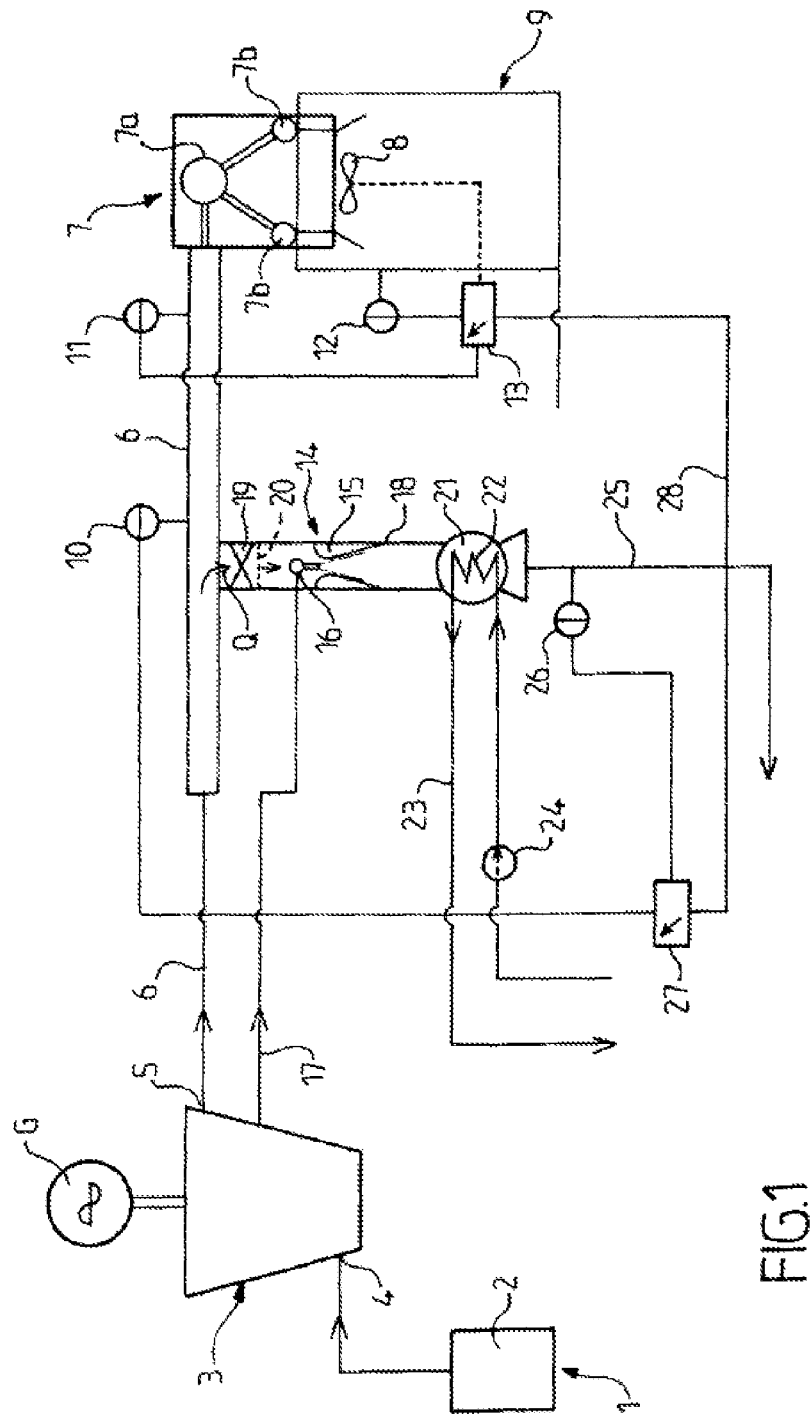
FIG. 1 is a diagram of a cogeneration plant implementing the method of the invention.

Reference is made to FIG. 1 of the drawings which shows a cogeneration plant comprising a hot source 1 consisting of a boiler 2 that produces superheated steam at high pressure, generally in excess of 20 bar. The invention more particularly relates to a cogeneration plant of the EfW type in which city waste is incinerated in the boiler 2 and which allows energy to be recuperated from the waste and electricity and heat to be produced simultaneously (Energy from Waste).

The steam produced by the boiler 2 is expanded through at least one condensation steam turbine 3. The high-pressure steam is admitted to the inlet 4 of the turbine. At the turbine outlet 5, the steam is at very low pressure, notably a pressure of between 100 and 240 mbar absolute at a temperature of 46° C. to 64° C. and may contain up to 12 wt % of water in the form of microdroplets. The outlet 5 is connected by a pipe 6 to a condenser 7 which constitutes the "cold" source of the closed thermodynamic cycle.

It will be recalled that a steam condenser is a heat exchanger used for condensing steam into liquid. During the condensation of the steam, the latent heat of condensation is recuperated by a cooling fluid of the condenser. The condensers, which are also steam-water heat exchangers, are widely used in the field of heating and treatment methods.

The turbine 3 turns an electric generator G, generally an alternator, to produce electrical energy. The steam leaving the turbine 3, either at the low-pressure outlet 5 or via an intermediate-pressure tapping, is used to obtain thermal energy.

The condenser 7 illustrated in FIG. 1 is an air condenser which uses ambient air as the cooling fluid. The air passes through finned heat exchange bodies, the air stream being obtained mechanically using one or more blowers 8. The steam arrives in the main body 7a, also referred to as the "plenum", of the condenser consisting of a substantially horizontal pipe the diameter of which may be as large as 2 m or more, which is connected by inclined pipes to smaller-diameter substantially horizontal cylinders 7b situated in the lower part and which collect the condensed water. This condensate is returned to the boiler 2 via a pressurized piping system 9.

A temperature sensor 10 and a pressure sensor 11 are provided on the pipe 6. A temperature sensor 12 is provided on one of the pipes of the system 9. The pressure and temperature respectively supplied by the sensors 11 and 12 are sent to a regulator 13 which controls the rotational speed of the blower 8 in order to maintain an optimum pressure on the exhaust side of the turbine.

Rather than consisting of an air condenser 7, the condenser could be produced in the form of a water condenser which uses water or a liquid solution as cooling fluid instead of the air used in the air condenser 7.

Water condensers are used in high-power thermoelectric power stations. Their high heat exchange capability generally entails the close proximity of a watercourse with a sufficiently high throughput, and allows the performance of the thermodynamic cycle to be improved. The cooling water passes through an exchanger with a tubular exchange surface or plates.

Some of the heat in the steam, referred to as the "waste" heat, is dissipated at the condenser (air or water condenser). Indeed steam under vacuum on the exhaust side of the turbine contains most of the heat in the form of latent heat of the gas, but can prove difficult to use in commonplace heating applications because of its relatively low temperature, generally comprised between 40° C. and 60° C.

The invention seeks to recuperate some of the "waste" heat which is dissipated at the condenser and to make use of it by using a minimum amount of driving steam, the purpose of this being to limit the impact on the electricity production of the turbogenerator G.

The invention thus applies to the recuperation of the heat of condensation of the low-temperature steam on the outlet or exhaust side 5 of the turbine (pressure below atmospheric pressure).

According to the invention, at least a fraction Q (FIG. 1) of the steam leaving the turbine is directed toward a venturi-effect thermocompressor 14 the venturi 15 of which in the conventional way having a convergent and a throat followed by a divergent.

The thermocompressor 14 comprises an ejector 16 situated on the axis of the venturi 15 upstream, near the inlet to the convergent. This ejector 16 is fed with medium-pressure steam, advantageously at around 5 bar, tapped from an intermediate stage of the nozzle by a duct 17. Injecting medium-pressure or high-pressure steam into the venturi 15 causes the creation of a suction chamber at the convergent, and of an expansion chamber at the divergent.

According to the embodiment of FIG. 1, the thermocompressor 14 is positioned on a steam pipe 18 branching off from the pipe 6 that connects the exhaust side of the turbine to the main condenser 7. A valve 19 may be provided for closing or opening the pipe 18. Depending on the wetness of the steam that is to be recompressed, a water droplet separator, notably in the form of a grating 20, is advantageously positioned downstream of the valve 19 and upstream of the ejector 16.

The low-pressure steam coming from the pipe 6 is subjected to a compression, in the thermocompressor 14, under the effect of the medium-pressure steam injected into the venturi 15. The compression of the steam coming from the pipe 6 causes an increase in the pressure and temperature of this steam. The two steams mix downstream of the venturi 15 in the closed pipe 18.

This then yields, downstream of the thermocompressor, a steam the saturation pressure of which is higher than that recovered from the pipe 6. By way of example, a steam with an upstream pressure of 100 to 240 mbar can be raised, downstream, to a pressure of 200 mbar to 500 mbar for a temperature of 60° C. to 81° C. in place of 46° C. to 64° C., and this can be done with the injection of a medium-pressure steam at 5 bar.

The increase in pressure is by around 100 mbar to 260 mbar and the increase in temperature by 15° C. to 17° C., the enthalpy increasing by 300 kJ/kg or more.

The pipe 18 is connected to a second condenser 21, preferably a water condenser, in which there lies a serpentine coil 22 through which there passes an auxiliary fluid, notably consisting of the water used to heat buildings or market-garden greenhouses, flowing through a series of pipes forming a circuit 23 external to the thermodynamic cycle. The external auxiliary fluid is set in motion by a pump 24. The auxiliary fluid is independent of the fluid of the thermodynamic cycle.

The condensed steam from the second condenser 21 is picked up by a pipe 25 and returned to the boiler 2. A temperature sensor 26 is installed on the pipe 25 and transmits the measured temperature value to a regulator 27 to which the temperature detected by the sensor 10 is also supplied. The regulator 27 on one outlet supplies a signal transmitted by a line 28 to the regulator 13.

The thermocompressor 14 allows the pressure and temperature conditions of the steam from the low-pressure outlet of the turbine to be raised to a level compatible with use. The heat of the steam compressed by thermocompression is then recuperated by the exchanger-condenser 21 which is able to feed the circuit 23 notably formed by a medium-temperature hot water network 23.

The thermocompression contributes to significantly increasing the heat capacity of a cogeneration on a condensation turbine by combining the heat of the steam leaving the turbine with that of the tapping that feeds the thermocompressor 14.

In the parallel set-up of the thermocompressor 14 according to FIG. 1, the thermocompressor is positioned on a circuit formed by the pipe 18 which is separate from the exhaust pipe 6 of the turbine but connected thereto. The condenser 21, which forms a heat recuperation exchanger, operates at a pressure and at a temperature which are higher than those of the primary condenser 7, or first condenser, to which the pipe 9 is connected, allowing effective use of heat by the external auxiliary-fluid circuit 23.

FIG. 2 is a diagram of a plant similar to that of FIG. 1 in which the various elements are denoted by the same numerical references. The auxiliary fluid heated in the exchanger of the condenser 21 is used for heating a greenhouse 29 or, as an alternative, for an industrial heating network.

FIG. 3 illustrates a plant comprising several thermocompressors, three in the example depicted, 14.1, 14.2, 14.3, respectively, installed on parallel branch-off pipes 18.1, 18.2, 18.3. Associated with each pipe and thermocompressor is a respective condenser 21.1, 21.2, 21.3 and a separate auxiliary-fluid circuit 23.1, 23.2, 23.3. The condensed water from each condenser is collected in one and the same pipe 25 to be returned to the boiler. As in the case of FIG. 1 and FIG. 2, the pipes 18.1, 18.2, 18.3 branch off from the turbine exhaust pips 6 between the turbine outlet and the condenser 7.

The thermocompressors 14.1, 14.2, 14.3 arranged in parallel cam operate with different flow rates and temperatures depending on the requirements of each user connected to the corresponding circuit 23.1, 23.2, 23.3. The plant therefore offers a great deal of operational flexibility.

FIG. 4 illustrates an alternative form of an embodiment in which the thermocompressor 14 is inserted in a vacuum pipe 30 situated on the outlet side of the air condenser 7. The pipe 30 is connected to the plenum 7a of the air condenser and is situated downstream of the pipe 6.

Those elements of the plant of FIG. 4 which are identical or similar to elements already described in relation to FIG. 1 are denoted by the same references and are not described again.

The layout of the thermocompressor 14 according to FIG. 4 may be qualified as a series set-up of the thermocompressor downstream of the air condenser on the vacuum pipe, but is in fact equivalent to a parallel operation.

FIG. 5 illustrates a series layout of two thermocompressors 14.1, 14.2 on a common vacuum pipe 31 which ends at the second condenser 21. The respective ejectors 16.1, 16.2 are supplied with medium-pressure steam, it being possible for this pressure either to be the same or to be different for each ejector. In order to recompress steam containing a high content of water microdroplets, a droplet separator 20.1, 20.2 is advantageously provided upstream of each thermocompressor. In preference, the driving pressure of the medium-pressure steam of the ejector 16.2 furthest downstream is higher than that of the medium-pressure steam of the upstream ejector 16.1.

The pressure and the temperature of the compressed steam, in zone C situated downstream of the thermocompressor 14.2 and upstream of the condenser 21, are higher than the pressure and the temperature of the steam in zone B comprised between the two thermocompressors 14.1, 14.2. The steam pressure and temperature in zone B are themselves higher than the pressure and the steam in zone A situated upstream of the first thermocompressor 14.1.

This series layout of several thermocompressors allows the steam pressure and temperature to be increased gradually.

Bearing in mind the very high speed (supersonic) of the gases in the nozzle formed by the venturi 15, the surfaces of the venturi and of the diffuser need to be protected against the risk of erosion caused by liquid particles contained in the steam. Wetness of the steam, in the form of droplets, at the outlet of a condensation turbine may be of the order of 5 to 15 wt. %.

The venturi 15 forming a nozzle may be made of very strong materials, notably stainless steel, stellite or some other surface treatment against erosion. It is also possible as illustrated in FIG. 6 to FIG. 9 to insert a liquid particle separator S upstream of the venturi 15.

According to the embodiment of FIGS. 6 and 7, the liquid particle separator S is produced in the form of a centrifugal separator 32 of the cyclone type. The turbine outlet pipe 6 opens tangentially (FIG. 7) into the top part of a cylindrical chamber 33 in which is positioned a coaxial tube 34 open at the bottom and connected at the top to another section of the piping 6 in which the thermocompressor 14 is installed. The mixture of steam and water droplets arriving in the top part of the cylindrical chamber 33 describes a downward spiral path, the water droplets are collected at the bottom of the chamber 33 and returned by a pipe 35 to the hot source, while the steam rises up the coaxial tube 34 to reach the thermocompressor 14.

FIG. 8 illustrates an alternative form of the embodiment of the separator S in the form of an impact separator 36 on a substantially horizontal stream of the steam/water-droplet mixture. The separator 36 is made up of a cylindrical chamber in which the mixture arrives at the bottom. A vertical middle partition 37, which acts as a baffle, constitutes a dynamic separator which holds back the water droplets collected at the bottom in the form of a conical hopper. The water collected is directed via a pipe 38 and recycled in the thermodynamic cycle. The steam escapes from the separator 36 via another portion of the pipe 6 provided at the top, and which is equipped with the thermocompressor 14.

FIG. 9 illustrates an alternative form of the embodiment 36a of the impact separator of FIG. 8, in which alternative form the partition 37a made of a permeable fibrous material or of a multitude of deflectors forming a baffle is inclined from the upper edge of the chamber 36a, situated on the same side as the inlet for the mixture of steam and water droplets, toward the lower opposite edge. The flow of the mixture of steam and water droplets is substantially vertical where it meets the screen 37a.

The invention offers numerous advantages.

The thermocompressor 14 combined with the condenser or secondary heat exchanger 21 allows all or some of the latent heat of condensation of the steam at the exhaust side 5 of the turbine 3 to be put to use and allows this heat to be transferred to a medium-temperature hydraulic circuit 23. This is achieved while at the same time avoiding an increase in the pressure of the steam under vacuum on the outlet side 5 of the turbine 3 and limiting the flow rate of steam tapped off to supply the ejector 16, so as not to impair the production of electricity.

The potential for recuperating heat from a primary water condenser with respect to the energy entering the system varies according to the efficiency of the thermodynamic cycle of the power station that produces the electricity.

The "waste" heat that escapes at the outlet of a steam turbine varies within a range from 40% to 55% of the energy produced by burning the fuel (waste, biomass, fossil fuel). The higher the efficiency of the cycle, the lower the temperature of the steam at the outlet, and vice versa.

As a result, highly efficient thermal power stations produce "waste" heat at a relatively low temperature level, of the order of 30° C., which is difficult and costly to use in traditional heating equipment.

EfW units that derive usable energy by incinerating waste have, by design, a turbine outlet steam temperature that is higher, from 45° C. to 60° C., which can more readily be used by nearby consumers of heat.

Unfortunately, the temperature of the steam leaving the turbine is subject to weather conditions, such that in winter the temperature of the steam leaving the turbine is often too low to be used directly by conventional heating means, thus entailing increasing the temperature level at no little cost.

With the thermocompressor 14, the invention allows the temperature of some of the steam to be raised independently of the weather conditions. The flow rate of compression steam delivered by the ejector 16 is constantly adjusted so as to limit the flow rate of steam tapped off from the turbine.

It should also be noted that the medium-pressure steam which supplies the ejector 16 has already produced motor power by partial expansion in the turbine 3.

An indirect advantage of diverting a fraction of the flow of steam under vacuum leaving the turbine is that a reduction in the electricity consumption of the air condensers 7, the electrical power of which is high, can be achieved.

The energy, economic and environmental impact of the use of the "waste" heat resource that is lost at the condenser by the electricity production units is potentially great.

Applications

The invention may be applied to raising the pressure and temperature of the steam under vacuum tapped off from the outlet side of a condensation turbine with a view to using the latent heat of the steam to feed into a hot water circuit for residential heating, or market gardening, or horticulture, or pisciculture and other activities requiring a low-temperature hot water circuit notably of the order of 60° C. to 70° C.

The invention may also find industrial heating applications in heating a hot water circuit used for drying sludge, compost, waste, wood or other materials and substances.

The invention may also be used to provide top-up heat for preheating fluids, water or combustion air, or for producing cold using adsorption (LiBr) refrigeration units supplied with water at 60° C.-80° C.

The invention finds numerous applications in the recuperation of heat in thermodynamic activities: thermal power stations, EfW power stations, chemical industries.

One example of an application is given hereinafter.

This example relates to the instance in which the external temperature is 6° C. In this scenario, a fraction of the steam is compressed to the required pressure, namely 0.17 bars (bar absolute), using a tapping of medium-pressure steam at 5 bar absolute before being admitted to a water condenser. At the same time, the charge of steam admitted to the air condenser is reduced and a lower vacuum steam pressure, typically 0.1 bar absolute, can be achieved.

Assuming that the plant is intended for heating a greenhouse with a surface area of 25 ha (25 hectares), namely that energy of 10.8 MWth (megawatt hours) is required (0.433 MWth/ha at 6° C. external), the flow rate of medium-pressure steam at 5 bar absolute to the thermocompressor will be 6.9 th which results in a power production of 25 348 kWe (kilowatts electrical). This power is 0.8% higher than without the thermocompression, for the same external temperature, namely at a vacuum pressure=0.17 bara (i.e. 25 149 kWe).

That means that assuming a greenhouse surface area of 25 ha, the unfavorable effect that tapping off steam at 5 bar absolute and sending it to the thermocompressor has on the production of energy is more than counter-balanced by the increase in power resulting from the lower vacuum pressure achieved. The thermocompression is beneficial to the heating of a greenhouse of a surface area smaller than 25 ha, preferably of 20 ha (20 hectares) or less.

According to the invention, with use of the external neat, the thermocompression makes it possible to recuperate and potentially put to use a large quantity of heat at a temperature level that is independent of that of the water-steam cycle of the plant. This heat can be used for an external use: city heating network, drying sludge or other biomass, or for an internal use for preheating the combustion air for the boiler.

The invention relates to a cogeneration application with the exporting of heat for an external use by an auxiliary fluid, generally a liquid, particularly water, but which could be a gas, particularly air.

The steam under vacuum is generally tapped off upstream of the main condenser 7 and a second condenser 21 installed in parallel with the first receives the compressed steam which gives up its latent heat to an auxiliary fluid, external to the thermodynamic cycle, from an external circuit 23.

All of the steam under vacuum leaving the turbine can thus be recuperated and put to use at a suitable service pressure and temperature, independently of the thermodynamic cycle; as a result, the flow rate of steam fed to the primary condenser 7 may become almost zero and, in that case, all of the energy in the form of steam which is produced by the boiler can be put to valuable use.

The energy performance of a condensation turbine equipped according to the invention is maximized because even with a very high flow rate of tapped-off medium-pressure steam it is still possible to use the minimum flow rate of steam for sweeping the low-pressure stages (generally representing 15% of the incoming flow rate).

The amount of heat produced and exported may reach 50% of the heat of the fuel and the amount of energy that can be derived from it is far higher than the simple increase in efficiency of the thermodynamic cycle.

The invention claimed is:

1. A cogeneration method comprising a hot source producing steam which is expanded through at least one turbine the low-pressure steam outlet of which is connected to a condenser, at least a fraction of the low-pressure steam leaving the turbine is directed toward a venturi-effect thermocompressor in which the steam, tapped from an intermediate stage of the turbine, at a temperature and pressure that are higher than those of the low-pressure steam, is injected near the throat of the venturi in order to yield a resultant fluid the pressure and temperature of which are higher than those of the low-pressure steam leaving the turbine, this resultant fluid being directed toward a second condenser, wherein the second condenser has passing through it an auxiliary fluid from a circuit external to the thermodynamic cycle of the turbine, and all or some of the latent heat of condensation of the steam, on the exhaust side of the turbine, is transferred to the external circuit.

2. The method as claimed in claim 1, wherein the auxiliary fluid comprises water for heating buildings or market-garden greenhouses.

3. The method as claimed in claim 1, wherein the steam tapped from the intermediate stage of the turbine and injected into the thermocompressor is at a pressure of around 5 bar.

4. The method as claimed in claim 1, wherein the medium-pressure steam tapped from the intermediate stage of the turbine is at a pressure suited to the necessary compression ratio.

5. The method as claimed in claim 1, wherein the steam pressure on the outlet side of the turbine is comprised between 100 and 240 mbar (temperature between 46° C. and 64° C. and that on the outlet side of the thermocompressor is comprised between 200 mbar and 500 mbar (temperature between 60° C. and 81° C.).

6. A cogeneration plant for implementing a method as claimed in claim 1, the plant comprising a hot source producing steam which is expanded through at least one turbine the outlet of which is connected to a condenser, and comprising at least one venturi-effect thermocompressor, means for directing at least a fraction of the low-pressure steam leaving the turbine toward the thermocompressor, and means for injecting into the thermocompressor steam at a temperature and pressure that are higher than those of the steam leaving so as to yield a resultant fluid the pressure and temperature of which are higher than those of the steam leaving the turbine, and a second condenser toward which this resultant fluid is directed, the plant further comprising an external circuit for an auxiliary fluid, and the second condenser has passing through it the auxiliary fluid so that all or some of the latent heat of condensation of the steam, on the exhaust side of the turbine, is transferred to the external circuit.

7. The plant as claimed in claim 6, wherein the external circuit consists of a medium-temperature hot water network, notably for heating buildings or market-garden greenhouses.

8. The plant as claimed in claim 6, further comprising a branch branching off from the turbine outlet pipe, the venturi-effect thermocompressor being installed on this branch-off, upstream of the first condenser.

9. The plant as claimed in claim 6, further comprising several branches in parallel branching off from the turbine outlet pipe, a venturi-effect thermocompressor being installed on each branch-off, upstream of the first condenser.

10. The plant as claimed in claim 6, further comprising several venturi-effect thermocompressors installed in series, one after another.

11. The plant as claimed in claim 6, further comprising a water droplet separator for eliminating water droplets from the steam prior to entry into thermocompressor.

12. The plant as claimed in claim 6, wherein the outlet pressure of the turbine is comprised between 100 and 240 mbar (temperature between 46° C. and 64° C.) and that on the outlet side of the thermocompressor is comprised between 200 mbar and 500 mbar (temperature between 60° C. and 81° C.), the medium-pressure steam of the turbine being around 5 bar.

* * * * *